United States Patent
Karanth et al.

(10) Patent No.: US 11,651,291 B2
(45) Date of Patent: May 16, 2023

(54) REAL-TIME PREDICTIONS BASED ON MACHINE LEARNING MODELS

(71) Applicant: salesforce.com, inc., San Francisco, CA (US)

(72) Inventors: Rakesh Ganapathi Karanth, San Mateo, CA (US); Arun Kumar Jagota, Sunnyvale, CA (US); Kaushal Bansal, Pleasanton, CA (US); Amrita Dasgupta, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 613 days.

(21) Appl. No.: 16/777,686

(22) Filed: Jan. 30, 2020

(65) Prior Publication Data

US 2021/0241179 A1  Aug. 5, 2021

(51) Int. Cl.
*G06N 20/20* (2019.01)
*G06N 7/00* (2023.01)

(52) U.S. Cl.
CPC ............. *G06N 20/20* (2019.01); *G06N 7/005* (2013.01)

(58) Field of Classification Search
CPC ........ G06N 20/20; G06N 7/005; G06N 20/00; G06N 5/003
See application file for complete search history.

(56) References Cited

U.S. PATENT DOCUMENTS

| | | | | |
|---|---|---|---|---|
| 10,867,303 | B1 * | 12/2020 | Manapat | G06Q 20/405 |
| 2018/0150783 | A1 * | 5/2018 | Xu | G06Q 10/0633 |
| 2019/0050378 | A1 * | 2/2019 | Novak | G06F 40/143 |
| 2020/0177731 | A1 * | 6/2020 | Aly | G06N 20/00 |
| 2020/0356895 | A1 * | 11/2020 | Ong | G06N 7/005 |
| 2021/0056436 | A1 * | 2/2021 | Shah | G06N 20/00 |
| 2021/0232920 | A1 * | 7/2021 | Parangi | G06N 20/20 |
| 2021/0241047 | A1 * | 8/2021 | Karanth | G06N 5/045 |
| 2021/0295174 | A1 * | 9/2021 | Zhang | G06N 3/082 |

OTHER PUBLICATIONS

Dubey, A., "Discretisation Using Decision Trees," Dec. 23, 2018, 11 pages, [Online] [Retrieved on Mar. 16, 2020] Retrieved from the Internet <URL: https://towardsdatascience.com/discretisation-using-decision-trees-21910483fa4b>.

Jyothsna, S. et al., "Improved Discretization Based Decision Tree for Continuous Attributes," International Journal of Computer Trends and Technology (IJCTT), vol. 5, No. 5, Nov. 2013, pp. 257-261.

SQL Pete, "Binning with decision trees," Jan. 23, 2017, five pages, [Online] [Retrieved on Mar. 16, 2020] Retrieved from the Internet <URL: https://sqlpete.wordpress.com/2017/01/23/binning-with-decision-trees/>.

* cited by examiner

*Primary Examiner* — Gil H. Lee
*Assistant Examiner* — Juan C Turriate Gastulo
(74) *Attorney, Agent, or Firm* — Fenwick & West LLP

(57) ABSTRACT

An online system performs predictions for real-time tasks and near real-time tasks that need to be performed by a deadline. A client device receives a real-time machine learning based model associated with a measure of accuracy. If the client device determines that a task can be performed using predictions having less than the specified measure of accuracy, the client device uses the real-time machine learning based model. If the client device determines that a higher level of accuracy of results is required, the client device sends a request to an online system. The online system provides a prediction along with a string representing a rationale for the prediction.

20 Claims, 9 Drawing Sheets

REAL-TIME PREDICTIONS BASED ON MACHINE LEARNING MODELS

BACKGROUND

Field of Art

This disclosure relates in general to machine learning based models, and in particular to performing real-time tasks using predictions using machine learning based models.

Description of the Related Art

Several online systems, for example, multi-tenant systems use machine learning based models for making predictions. These machine learning based models are invoked by applications that may execute on client devices. Furthermore, for certain applications, a multi-tenant system may generate scores using the machine learning based models on a periodic basis, for example, once every hour or once a day. The multi-tenant system provides the results of execution of the machine learning based models to the client device. The multi-tenant system provides the generated scores to the users of the tenants for invoking via their applications. This allows the use of powerful hardware of the multi-tenant system to execute the machine learning based model while incurring low communication overhead while transmitting the generated results to the client devices. Such techniques are suited for applications that do not require results of the machine learning models in real-time. However, such systems are inadequate if the results of execution of the machine learning based model are needed in real-time. For example, a client device may not be able to generate accurate results immediately in response to changes in the features used as input. The user is required to wait until the execution of the model is triggered on a periodic basis.

Figure 1:
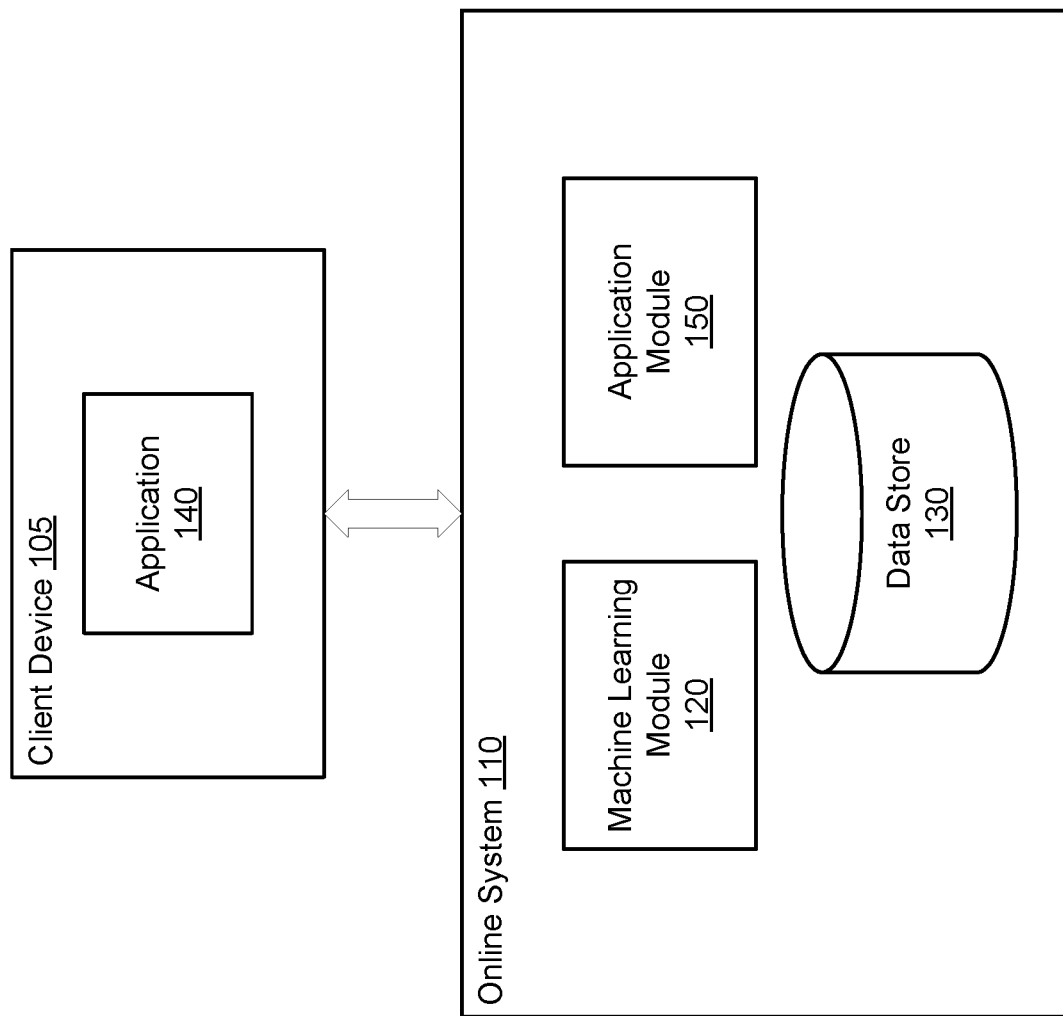
FIG. 1 is a block diagram of a system environment 100 for performing real-time predictions based on machine learning models, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system performs predictions for real-time tasks and near real-time tasks that need to be performed by a deadline.

A client device receives a machine learning based model that is identified herein as a real-time ML model. The client device also receives a measure of accuracy of the real-time ML model from the online system. The online system stores another machine learning based model identified as a near real-time ML model that is more computation intensive and requires more storage than the real-time ML model. For example, the real-time ML model is a regression based machine learning model and the near real-time ML model is one of a decision tree based model, a deep learning based neural network, or a random forest based model.

The client device receives a request to perform a task. The client device determines based on various factors whether to execute the real-time ML model or the near real-time ML model to perform the task. In an embodiment, the client device determines that a level of expected accuracy required for performing the task is below the measure of accuracy of the real-time ML model and accordingly decides to execute the real-time ML model for performing the task. In an embodiment, the client device determines that the task is associated with a deadline that requires less than a threshold amount of time for completing the task and accordingly decides to execute the real-time ML model for performing the task. In an embodiment, the client device determines that the available network bandwidth for the client device is below a threshold and therefore decides to execute the real-time ML model for performing the task. In an embodiment, the client device determines that the amount of load on the online system or the client device exceeds a threshold, thereby deciding to use the real-time ML model for performing the task. The client device may determine that the amount of load exceeds a threshold value based on either actual monitoring of number of tasks being received by the client device or the online system or based on historical data. For example, the client device may determine based on historical data that load is expected to be high during a particular time of the day, a time of the week, or a time of the year and accordingly decides to use the real-time ML model. If the client device decides not to use the real-time ML model by evaluating one or more of these factors, the client device executes the near real-time ML model as described below.

To execute the real-time ML model, the client device extracts features of the task and provides the extracted features as input to the real-time ML model for execution on the client device. The task is performed using the result of execution of the real-time ML model.

For a task, the client device may determine to use the near real-time ML model on the online system. The client device extracts features of the task and serializes the extracted features. The client device transmits the serialized features to the online system. The online system receives the serialized features and provides the features as input to the near real-time machine learning based model. The online system executes near real-time ML model to generate the results. The online system sends the results of execution of the near real-time ML model to the client device. The client receives the output of the near real-time ML model from the online system. The task is performed using the received output.

In some embodiments, the online system is a multi-tenant system and the client device is associated with a user of a tenant of the multi-tenant system. Each of the real-time ML model and the near real-time ML model is trained using the training data set of the tenant.

According to some embodiments, the online system generates a rationale for ML predictions. The rationale provides an explanation to a user, why a particular prediction was made. In an embodiment, the rationale identifies selected features that had significant contribution to the prediction. The rationale may describe additional information describing the features, for example, whether a feature had a positive contribution or a negative contribution to the predicted result. The rationale may include a value indicating an amount of contribution of each of the selected features to the prediction.

The online system generates the rationale as follows. The online system receives a request for making a prediction using a machine learning model. The machine learning model is a decision tree based ML model. The request comprises a feature vector for providing as input to the decision tree based ML model. The feature vector is provided as input to the decision tree based ML model and the decision tree based ML model is executed to generate a prediction. A trace of execution of the decision tree based ML model is obtained. The trace identifies an execution path taken through the decision tree during execution of the decision tree based ML model. Some features are selected from the trace of execution of the decision tree based ML model. A string indicating a rationale for the prediction of the decision tree based ML model is generated based on information describing the selected features. The generated string is transmitted to a client device for presentation via a user interface.

The techniques disclosed herein can be used for various applications of machine learning, for example, client devices that collect and process sensor data, controlling robot movements, ranking search results, predicting user interactions, signal processing, speech recognition, predicting values of items, and so on.

Overall System Environment

FIG. 1 is a block diagram of a system environment 100 for performing real-time predictions based on machine learning models, according to one embodiment. The system environment 100 comprises an online system 110 and one or more client devices 105. In other embodiments, the system environment 100 may include more or fewer components, for example, there may be third party systems that interact with the multi-tenant system.

The online system 110 comprises a machine learning module 120, an application module 150, and a data store 130. The online system 110 may include other modules than those shown in FIG. 1. Functionality indicated as being performed by a particular module as described herein may be performed by other modules.

In some embodiments, the online system 110 is a multi-tenant system. Each tenant may be an enterprise. Each tenant may represent a customer of the multi-tenant system. Each tenant may have multiple users that interact with the multi-tenant system via client devices 105.

A multi-tenant system stores data for multiple tenants in the same physical database. However, the database is configured so that data of one tenant is kept logically separate from that of other tenants so that one tenant does not have access to another tenant's data. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

The data store 130 stores data that is processed by the online system 110. In embodiments where the online system is a multi-tenant system, the data store 140 is a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

As an example, a tenant might be a company that employs a team of sales representatives where each sales representative uses a client device 105 to manage their sales process. Thus, the data store may store customized objects that represent contact data, leads data, customer follow-up data, performance data, goals and progress data, etc., all applicable to a user's personal sales process.

The machine learning module 120 trains machine learning based models. The details of the machine learning module 120 are further illustrated in FIG. 2 and described in connection with FIG. 2.

The application module 150 stores instructions of different applications that the multi-tenant system 110 allows tenants to execute. In one embodiment, the online system 110 is a multi-tenant system that implements a web-based customer relationship management (CRM) system and the application module 150 stores applications configured to implement and execute CRM software applications.

The client device 105 comprises an application 140. The application 140 may invoke machine learning based models that are trained by the machine learning module 120. A user may execute the application 140 to view results based on execution of a machine learning based model. The user may use the application 140 to perform certain actions. For example, the user may execute the application in connection with an interaction with one or more other users to complete a transaction.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the system architecture and the processes described herein are illustrated using a multi-tenant system, the techniques disclosed are not limited to multi-tenant systems but can be executed by any online system.

System Architecture

Figure 2:
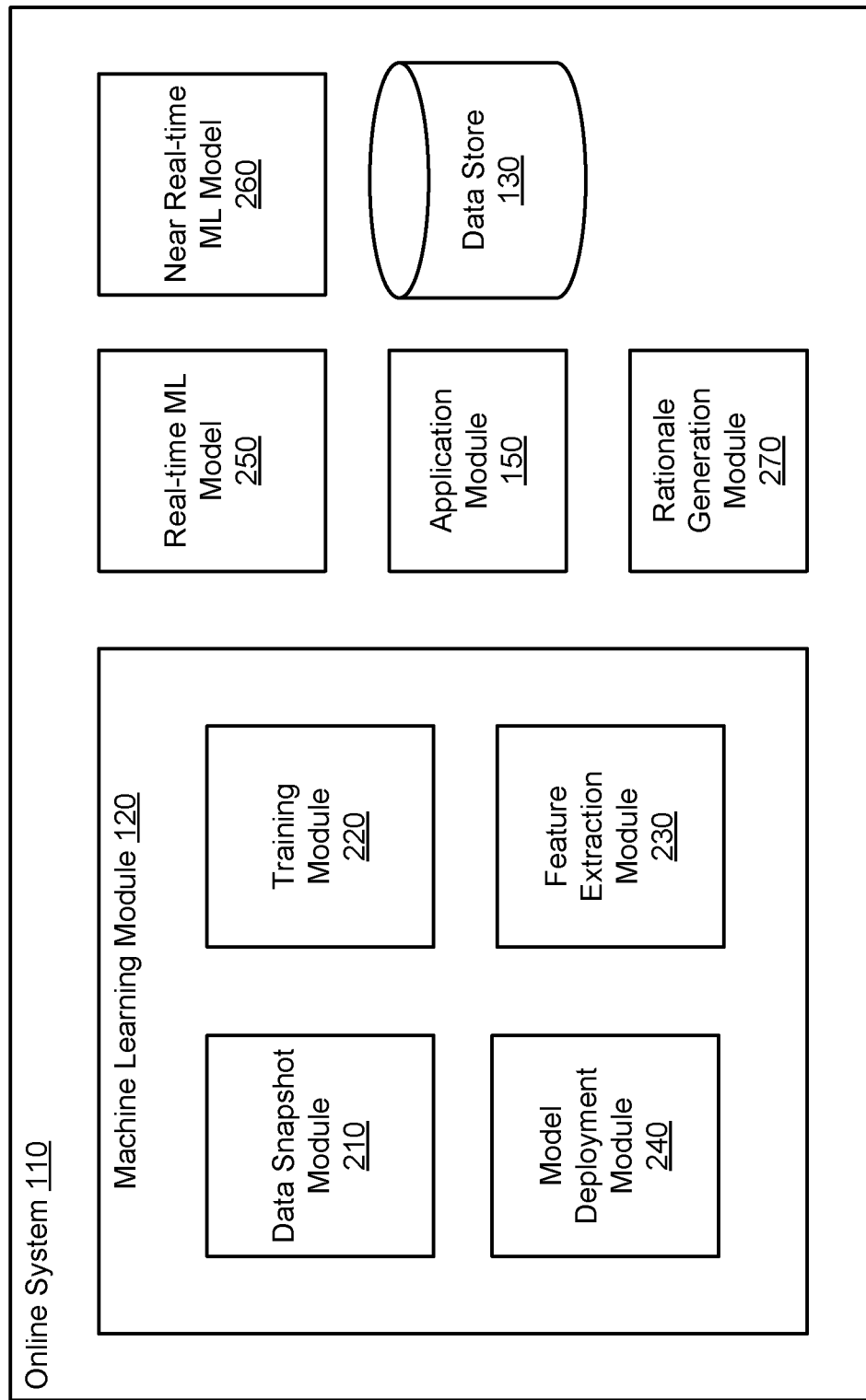
FIG. 2 is a block diagram illustrating the components of the online system according to one embodiment.

FIG. 2 is a block diagram illustrating components of the online system according to one embodiment. The online system 110 comprises a machine learning module 120, an application module 150, a data store 130, a real-time ML model 250, a near real-time ML model 260, and a rationale generation module 270. Other embodiments can have different and/or other components than the ones described here, and that the functionalities can be distributed among the components in a different manner. In some embodiments, the online system is a multi-tenant system. A multi-tenant system typically trains machine learning based models for each tenant using data specific to the tenant.

The machine learning module 120 is configured to train and deploy machine learning based models. The machine learning module 120 comprises a data snapshot module 210, a training module 220, a model deployment module 240, and a feature extraction module 230. The application module 150 and the data store 130 are described herein in connection with FIG. 1.

The data snapshot module 210 obtains training data for training the machine learning based models. The data snapshot module 210 periodically obtains a snapshot of data generated by the online system 110 during production, for example, based on user interactions with the online system 110. In embodiments, where the online system 110 is a multi-tenant system, the data snapshot module 210 may obtain data snapshot at different periodicity for different tenants. For example, one tenant may take data snapshots every three months and another tenant may take data snapshots every 6 months. An expert, for example, a data scientist may review the information of each tenant to determine the rate at which the data snapshot is periodically obtained. In some embodiments, the online system exports the required data as a snapshot in a serialized format such as AVRO format, Javascript object notation (JSON), or comma separated values (CSV) to a data lake, for example Hadoop file system (HDFS) or HBase and then run the training process of the machine learning based models on a dedicated cluster of processors.

The training module 220 performs training of the machine learning based models. The training module 220 may perform various types of operations during the training process including data normalization, feature engineering, principal component analysis (PCA), grid search for parameter optimization, K-fold cross validation for model selection, and so on.

The machine learning module 120 trains the machine learning based models to obtain a trained ML model that can be deployed on production systems. The model deployment module 240 deploys the trained models on a production system. The model deployment module 240 monitors concept drift for the trained models. The online system 110 continues to use an ML model to make predictions for new data so long as the model deployment module 240 does not detect a concept drift. If the model deployment module 240 detects concept drift, the machine learning module 120 re-trains a new ML model based on the latest data snapshot.

In some embodiments, the machine learning module 120 trains the ML models at a regular cadence.

The machine learning module 120 trains two models, a real-time ML model 250 and a near real-time ML model 260. The online system 110 stores the trained models including the real-time ML model 250 and a near real-time ML model 260. However, the online system 110 may send the parameters of the real-time ML model 250 to one or more client devices that need to execute a machine learning based model for real-time usage scenarios that perform tasks that have a time deadline that requires an action to be taken within a threshold time interval, for example, within T1 seconds of the current time. Accordingly, a client device that receives the real-time ML model 250 can execute the model locally within the client device without requiring further interactions with the online system 110. However, if a client device needs to execute the near real-time ML model 260, the client device sends the features to the online system 110 for providing as input to the near real-time ML model 260r.

The real-time ML model 250 is a simplified machine learning based model that is efficient to execute and also requires less storage. The real-time ML model 250 is efficient in terms of being transmitted over the network from a server to client devices. Since the real-time ML model 250 is storage efficient, it can be stored on client devices that have limited storage capacity compared to a server. Since the real-time ML model 250 is efficient in terms of execution, it can be executed on a client device with limited computing power compared to a server.

In an embodiment, the real-time ML model 250 is a linear regression model that is represented using the following equation.

$$Result = w_1 * x_1 + w_2 * x_2 + w_3 * x_3 + \ldots + w_n * x_n + b$$

In this equation, the values $w_1, w_2, w_3, \ldots, w_n$ represent weights of real-time ML model 250 and the $x_1, x_2, x_3, \ldots, x_n$ represent the features that are input to the model, and b represents a bias value. The linear regression model may use L1 norm or L2 norm. The real-time ML model 250 can be any regression based ML model, for example, polynomial regression based ML model, simple linear regression based ML model, or a multivariate regression ML model.

The near real-time ML model 260 has higher accuracy than the real-time ML model 250. Accordingly, if an application 140 needs higher accuracy than the accuracy provided by the real-time ML model 250, the application 140 invokes the near real-time ML model 260. The near real-time ML model 260 requires a significant amount of storage space that is more than a threshold, for example, more than 500 MB. The large size of the model makes it difficult to transmit the model from the server to the client device. Accordingly, the near real-time ML model 260 is not transmitted to any client device and is stored on a server of the online system 110 and executed on the server of the online system 110.

In an embodiment, the near real-time ML model 260 is a decision tree based machine learning model. In another embodiment, the near real-time ML model 260 is a deep learning based neural network model. In an embodiment, the near real-time ML model 260 is a random forest based machine learning model.

The rationale generation module 270 generates a string that represents a description of a rationale for the prediction of the near real-time machine learning based model 260. If the near real-time machine learning based model 260 is a decision tree based machine learning model, the string representing the description of a rationale for the prediction is generated based on an execution of the decision tree based machine learning model. The details of generation of the rationale for the prediction are further described in detail herein.

The feature extraction module 230 extracts features based on training data or new unobserved data for providing as input to a machine learning based model. The types of features extracted depend on the output that the machine learning based model is being trained to predict.

Figure 3:
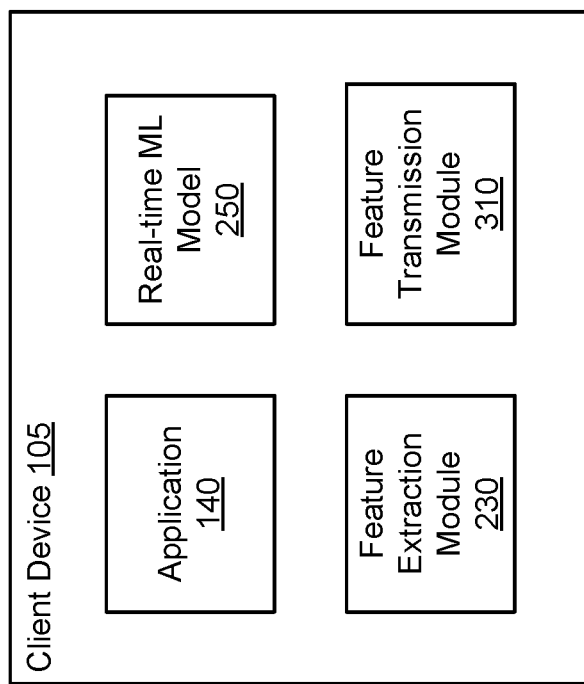
FIG. 3 is a block diagram illustrating the components of a client device according to one embodiment.

FIG. 3 is a block diagram illustrating components of a client device according to one embodiment. A client device 105 comprises an application 140, a feature extraction module 230, a real-time ML model 250, and a feature transmission module 310. Other embodiments may include more or fewer modules.

The feature extraction module 230 and the real-time ML model 250 are described in detail herein. The application 140 invokes the machine learning based models and determines whether to invoke the real-time ML model 250 or the near real-time ML model 260. Typically, the application 140 provides a user interface for use by a user, for example, an agent of an enterprise representing a tenant of a multi-tenant system. The feature transmission module 310 serializes features for sending them to the online system 110 to invoke the near real-time ML model 260.

Overall Process

FIGS. 4-8 show flow charts illustrating processes performed by either the client device or the online system according to various embodiments. Various embodiments can perform the steps of FIGS. 4-5 in different orders than those indicated herein. Moreover, other embodiments can include different and/or additional steps than the ones described herein.

Figure 4:
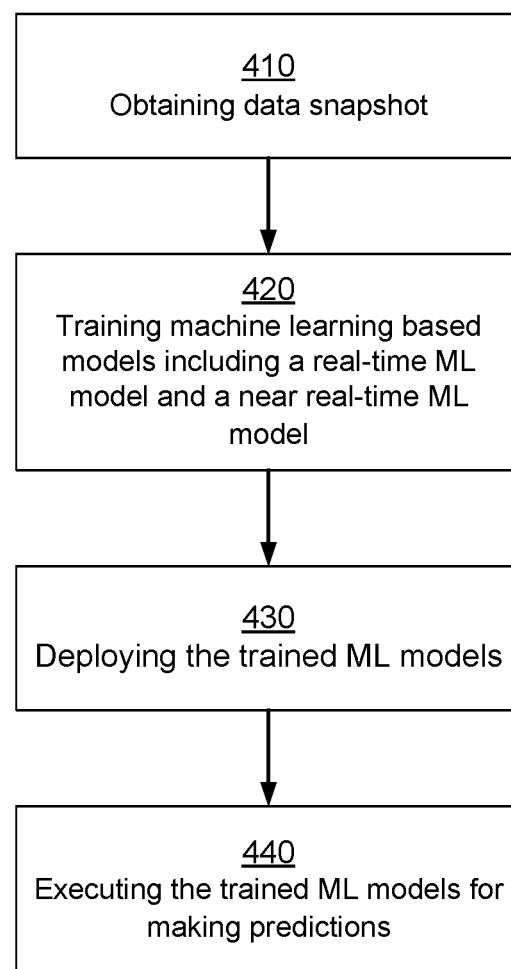
FIG. 4 is a flow chart illustrating the overall process for training machine learning based models in the online system according to one embodiment.

FIG. 4 is a flow chart illustrating the overall process for training machine learning based models in the online system according to one embodiment. The data snapshot module 210 obtains 410 a snapshot of data. For example, if the data store 130 stores tenant data, the data snapshot module 210 may serialize the tenant data and copy it to a server. Taking snapshot of the data and copying it to a server ensures that the process of training of machine learning models does not slow down a production system.

The training module 220 trains machine learning models based on training data obtained from the snapshot of the data. The training module 220 trains both the real-time ML model 250 and the near real-time ML model 260. Typically, the process of training the near real-time ML model 260 is more computation intensive than the process of training the real-time ML model 250 since the near real-time ML model 260 is typically more complex and each execution of the near real-time ML model 260 takes longer than an execution of the real-time ML model 250.

The model deployment module 240 deploys 430 the trained machine learning based models. The trained models may be stored on the online system 110. However, if a client device needs to store a real-time ML model 250 in the local storage of the client device, the model deployment module 240 transmits the trained real-time ML model 250 to the client device by transmitting all the weights of the model and the bias value. The model deployment module 240 deploys the near real-time ML model 260 on the online system 110.

The trained ML models are executed for performing tasks that the online system 110 and the client device 105 are configured to perform. The client device 105 performs real-time tasks using the real-time ML model 250 and the online system 110 performs near real-time tasks using the near real-time ML model 260. The details of the executions of the models are further described herein.

Figure 5:
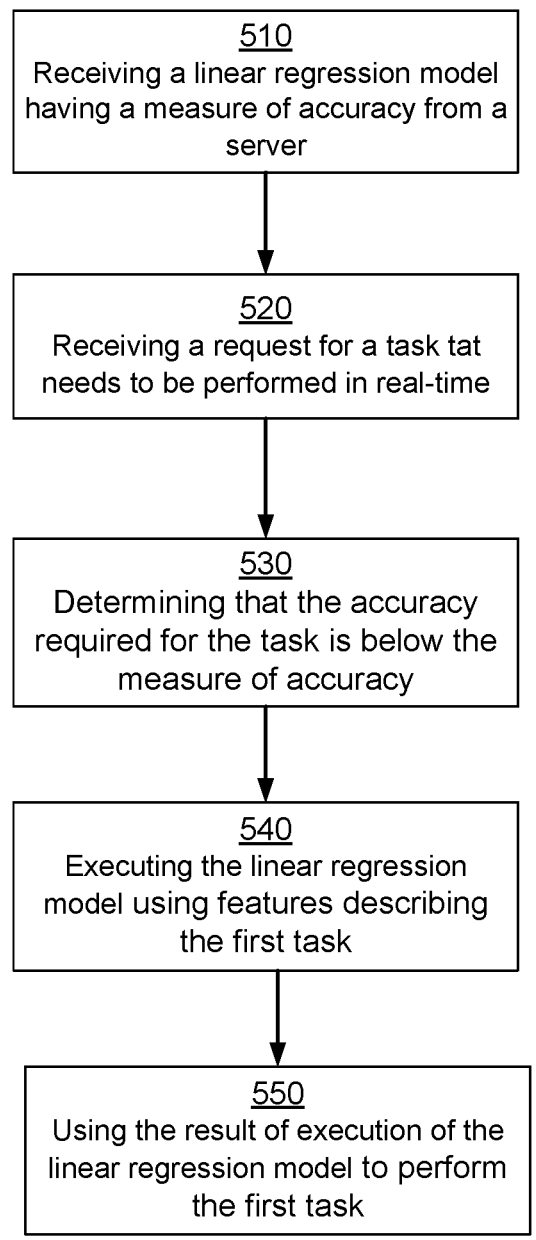
FIG. 5 is a flow chart illustrating the process for executing tasks based on machine learning based models that need results in real-time according to one embodiment.

FIG. 5 is a flow chart illustrating the overall process for executing tasks based on machine learning based models that need results in real-time according to one embodiment. The client device 105 receives a regression based ML model from an online system. The regression based ML model represents a real-time ML model 250. The client device also receives a measure of accuracy of the regression based ML model from the online system. The client device stores the regression based ML model in a local storage of the client device.

The client device 105 executes an application that may be used by a user to perform tasks. The task may involve user interactions with the client device or user actions that may be performed using other devices, for example, call made using phones. The application receives a request for a task. For example, the task may represent a transaction of an enterprise representing a tenant of a multi-tenant system. Executing the transaction may require determining values of one or more items associated with the transaction. An item may be a product or a service offered by the enterprise.

The client device 105 makes a determination that the level of expected accuracy for the task is below the measure of accuracy of the regression based ML model. This determination may be made based on the context in which the prediction is being made. For example, for certain applications, obtaining the result before a particular deadline may be more important than obtaining a highly accurate result. Accordingly, the client device determines that using the real-time ML model 250 that provides less accurate results is acceptable compared to an accurate result that may be obtained by executing the near real-time ML model 260.

In some embodiments, the client device 105 makes a determination to use the real-time ML model 250 for prediction in response to making a determination that the results are required for a task that needs to be completed before a given deadline. Accordingly, the client device 105 makes a determination that the task must be completed in real-time and therefore the prediction must be made in real-time. An example of a task that must be completed before a deadline is an ongoing transaction that is based on the results of the prediction. The results of prediction are needed before the transaction is completed since the results are used during the transaction. The transaction may be associated with an ongoing phone call and the task needs to be performed in real-time since the transaction is expected to be completed during a phone call. The chances of successfully completing the transaction are significantly lower if the transaction is not completed during the call.

In an embodiment, the client device 105 makes a determination to use the real-time ML model 250 for prediction based on a measure of load representing the number of tasks being performed. The measure of load may be determined by monitoring actual tasks received. Alternatively, the measure of load may be determined based on the current time, for example, the time of the year, the time of the week, or the time of the day. The client device 105 may use historical data to determine that particular times are expected to have higher loads and therefore based on the time, determine whether to use a real-time ML model 250 or a near real-time ML model 260.

The client device 105 extracts features describing the task. The extracted features are provided as input to the real-time ML model 250. The client device 105 executes the real-time ML model 250 with the extracted features of the task as input. The task is performed using the result of execution of the regression based ML model. The task may be performed by the application 140 and may involve actions by users that may use the client device and may use other devices, for example, a phone other than the client device.

Figure 6:
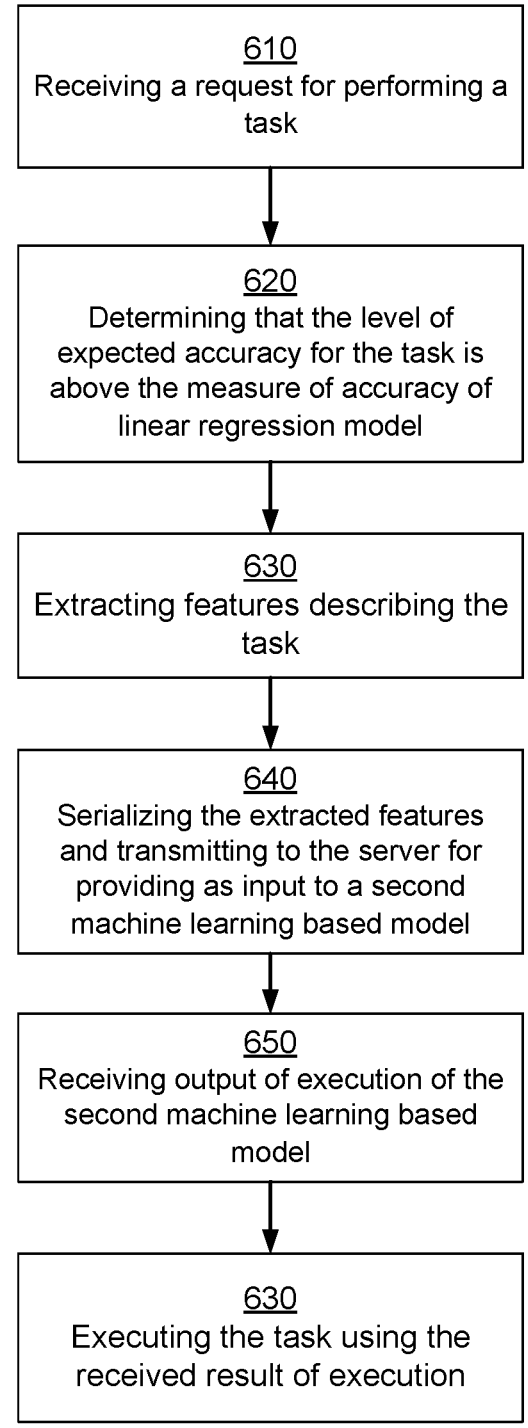
FIG. 6 is a flow chart illustrating the process for executing tasks based on machine learning based models that need results in near real-time according to one embodiment.

FIG. 6 is a flow chart illustrating the overall process for executing tasks based on machine learning based models that need results in near real-time according to one embodiment.

The client device 105 receives 610 a request for performing a task that needs to be completed in near real-time. Accordingly, the task has a deadline that is longer than the deadline for real-time tasks. For example, an agent of an enterprise that represents a tenant of a multi-tenant system is able to follow up with a third party with a subsequent call rather than complete the transaction in one call. As a result, the agent has more time to determine values that are predicted by the ML models compared to a situation in which the agent must complete the transaction during the current call. In an embodiment, the client device 105 determines to use the near real-time ML model 260 responsive to a determination that the expected accuracy of prediction results is higher than the level of accuracy that is provided by the real-time ML model 250. In an embodiment, the client device 105 determines to use the near real-time ML model 260 responsive to a determination that there is a need to present a rationale for the prediction results describing why the ML model predicted the results. The client device 105 uses the near real-time ML model 260 since the near real-time ML model 260 is configured to provide the rationale and the real-time model 250 is unable to provide the rationale. These determinations of the type of ML model used for completing a task may be made by a user and are indicated to the client device 105 via a user interface of the application 140.

The application 140 executing on a client device 105 determines that the near real-time ML model 260 should be used for making predictions for the current task. Accordingly, the client device 105 extracts 630 the feature values that need to be provided as input to the near real-time ML model 260. The client device 105 serializes 640 the feature values and transmits the serialized feature values to the online system 110 for providing as input to the near real-time ML model 260. The server of online system 110 receives the feature values and provides the feature values as input to the near real-time ML model 260. The server of the online system 110 executes the near real-time ML model 260 and sends the results to the client device that sent the feature values. The client device 105 receives the output of the near real-time ML model 260 from the online system. The requested task is performed using the received output of the near real-time ML model 260. The task may be performed by a user of the client device and may use the application 140 as well as other devices or systems.

In some embodiments, the client device 105 sends a request to the online system 110 with the serialized features to execute the near real-time ML model 260 and in parallel executes the real-time ML model 250 to determine the less accurate results. If the results from the online system 110 are received within a threshold time interval, the client device 105 uses the accurate results received from the online system 110. However, if the results from the online system 110 are not received within a threshold time, the client device 105 proceeds with the less accurate results of the real-time ML model 250 and completes the task.

Features Used by Machine Learning Based Models

The features provided as input to the machine learning based models 250, 260 depend on the task that the results of the machine learning based models are being used for and the application that invokes the models. For example, the application may determine values of one or more items associated with a transaction. A transaction may be associated with interactions performed by a user of the online system 110. The interactions may be performed by the user with a third party or a third-party system. The user of the online system may represent an agent of an enterprise that represents a tenant of a multi-tenant system or a user. The third party may be a potential customer of an enterprise associated with the online system 110.

The transaction may represent a sale of an item such as a product or service. The prediction by the ML models may determine a value of one or more items that are the subject of the transaction. In an embodiment, the prediction by the ML models determine a potential change in the value of one or more items that are the subject of the transaction, for example, a discount that may be offered as part of the transaction.

The online system 110 stores data associated with the transactions, for example, records or objects storing information associated with potential transactions of the enterprise. Accordingly, the user U1 of the enterprise E1 identifies a potential transaction between enterprise E1 and enterprise E2 related to the product or service offered by enterprise E1. The potential transaction may be a sale of the product or service or an agreement that results in enterprise E2 using the product or service of enterprise E1 in exchange for certain remuneration, for example, a monetary payment. The potential transaction is also referred to herein as an opportunity.

The interactions between the user U1 and users associated with the enterprise E2 may include online interactions with the third-party system, for example, via email, messenger, video conference, and so on. Other interactions between the user U1 and users associated with the enterprise E2 may be performed outside the third-party system and/or the online system 110. For example, the user U1 and users associated with the enterprise E2 may interact via phone, mail, or in person. However, information describing these interactions is provided to the online system 110 and stored by the online system 110 in connection with the potential transaction associated with enterprise E2.

The real-time ML model 250 and the near real-time ML model 260 receive as features, attributes of potential transaction object associated with a task as input. Attributes of a potential transaction object that are provided as a feature to the ML models 250, 260 include, a name of the potential transaction object, information identifying the third party, information identifying an item offered by the first enterprise that is a subject of the potential transaction, for example, a product or service offered by the first enterprise, an amount representing a value of the potential transaction, a date of creation of the potential transaction object or the date of initiation of the interaction between the first enterprise and the third party in connection with the potential transaction, an identifier of the user creating the potential transaction object, an identifier of the potential transaction object, an expected closing date for the potential transaction, and so on. Other attributes of a potential transaction object that are provided as input to the ML models 250, 260 include attributes of an account associated with the potential transaction object, the account representing an enterprise or an organization that is a party involved in the potential transaction. Examples of attributes of the account of a potential transaction object that are used as features include a measure of annual revenue of the account, a type of account (based on a size of the enterprise or the type of activities of the enterprise), a rating of the enterprise based on past transactions of the enterprise, ownership of the enterprise, and so on.

Other features used as input for the ML models 250, 260 for a task representing a transaction include names of the items that are part of the transaction, a unit price for the items, a number of the items that are part of the transaction, a type of currency for the transaction, and so on.

The techniques disclosed herein may be used for other types of applications. For example, real-time ML models 250 and near real-time ML models 260 may be used for a robotics application, where the robot needs to make predictions for navigation and has limited computational resources and communication bandwidth. The level of accuracy required for the results of the predictions may depend on the number of obstacles and positions of obstacles in a path through which the robot is navigating.

In one embodiment, an application predicts a type of user interaction being performed by a user of an application executing on a client device. The application may customize the user interface based on the predicted user interaction. The client device may determine whether to use the real-time ML model 250 or the near real-time ML model 260 based on the network bandwidth available.

In one embodiment, an application ranks search results based on searches performed by a user of an application executing on a client device. The application may present results from a cache on the client device or request additional results from the online system. The client device determines whether to use the real-time ML model 250 or the near real-time ML model 260 based on the network bandwidth available.

Determining Rationale for Prediction of a Machine Learning Based Model

The online system 110 generates a rationale for a prediction made by a machine learning based model. The rationale provides expected reasons as to why the prediction was made. The rationale is provided to users via a user interface. For example, the user that receives the rationale may be an agent of an enterprise that is a tenant of a multi-tenant system.

The rationale may be used for making determinations related to the prediction. The prediction may represent a value of one or more items associated with a transaction or a discount offered towards the value of the items associated with the transaction. The agent may use the rationale to determine whether the prediction is reasonable or is justified. The rationale may be provided to instill confidence in the predictions of the machine learning based models, for example, if the machine learning based models are being used by an enterprise for the first time. The rationale may be used during AB testing of a machine learning based model.

An online system may provide rationale based on manually curated rules. Embodiments use a white box machine learning based model such as a decision tree based ML model for generating the rationale for a prediction.

Figure 7:
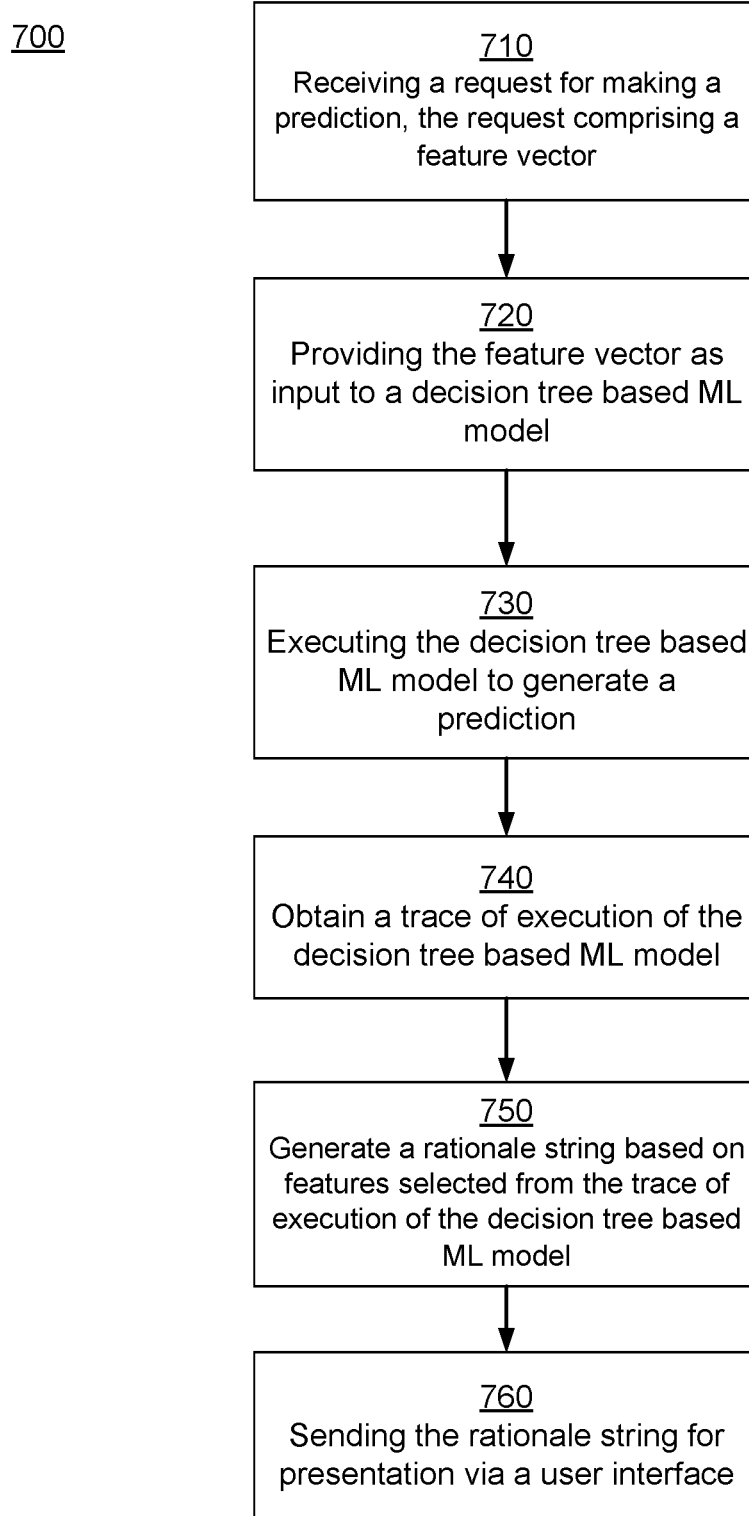
FIG. 7 is a flow chart illustrating the process of generating rationale for predictions of a machine learning based model according to one embodiment.

FIG. 7 is a flow chart illustrating the process of generating rationale for predictions of a machine learning based model according to one embodiment. The online system 110 receives 710 a request for making a prediction using the near real-time machine learning based model 260. In this embodiment, the near real-time machine learning based model 260 is a decision tree based ML model. The request comprises a feature vector for providing as input to the decision tree based ML model.

The online system provides 720 the feature vector as input to the decision tree based ML model. The online system 110 executes 730 the decision tree based ML model to generate a prediction. The rationale generation module 270 of the online system 110 obtains 740 a trace of execution of the decision tree based ML model. The trace identifies an execution path taken through the decision tree during execution of the decision tree based ML model.

The rationale generation module 270 selects one or more features in the trace of execution of the decision tree based ML model and generates 750 a string based on information describing the selected features. The generated string indicates a rationale for the prediction of the machine learning model. The online system sends 760 the generated string to a client device for presentation via a user interface.

In an embodiment, the generated string representing the rationale identifies features based on their significance in determining the prediction. The generated string representing the rationale may comprise a sequence of features that contributed to the prediction. The order of the features in the sequence may represent the level of contribution of each feature. The rationale generation module 270 determines the significance of each feature based on the order in which the feature occurs in the execution path. Accordingly, features occurring earlier in an execution path in the decision tree are assigned higher significance than features that occur later in the decision tree in the execution path. In an embodiment, the rationale generation module 270 lists the features in order of their significance, for example, a descending order of significance such that more significant features are listed before less significant features.

In an embodiment, the online system determines a type of contribution to the prediction by each of the features selected for including in the rationale. The type of contribution represents either a positive contribution or a negative contribution. The generated string includes information describing the type of contribution of each of the selected features.

In an embodiment, the rationale generation module 270 determines a value indicating an amount of contribution to the prediction of each of the selected features. The generated string includes information describing the amount of contribution of each of the selected one or more features. An example of a portion of the string representing the rationale for a prediction is "Effect of feature F1: +10%; Effect of feature F2: −5%; Effect of feature F3: +2%."

In some embodiments, the online system 110 allows the generated string representing the rationale to be modified based on manually provided rules. Accordingly, a user, for example, a data scientist may modify a generated rationale string by adding one or more features to the rationale. In an embodiment, the online system 110 receives a configuration file that defines the rules for modifying a generated rationale. A rule may specify that one or more features are added to the beginning of the rationale string. A rule may specify that one or more features are added to the end of the rationale string. A rule may specify that one or more features are inserted in the rationale string if a particular feature is present in the rationale. For example, the rule may specify that if feature $F_x$ occurs in the rationale string, the rationale string should be modified by inserting features $F_y$ and $F_z$ immediately after the feature $F_x$. The ability to modify the generated rationale based on manually provided rules allows a data scientist to improve on the generated rationale string if for any reason the generated rationale fails to capture certain aspects of the prediction that is known to the data scientist.

A feature may be numerical or categorical. If a feature is categorical, the rationale generation module 270 includes in the rationale string, information describing the category of the feature value along with information identifying the feature. However, if the feature is numerical, the rationale generation module 270 determines a more intuitive description of the feature value rather than the value itself. The rationale generation module 270 categorizes numerical features into bins.

In some embodiments, the online system 110 uses manual or hard coded bins for categorizing numeric features. A fixed set of boundaries (or rules) are defined and used for categorizing, for example, manually by a user irrespective of how the underlying data is distributed. In systems that predict values of items and that deal with a large variety of items such hard coded boundaries for categorization may not provide meaningful rationale. Furthermore, if there is a complex set of features used for making predictions, identifying the right set of rules is difficult and such rules can be erroneous or become outdated over time.

According to some embodiments, the online system 110 trains a machine learning based model on the data and uses that model to define the boundaries of the bins and correspondingly the rules for data categorization. An example of the machine learning based model is a decision tree based ML model. Accordingly, the online system 110 generates bins that capture the underlying data distribution. The rationale generation module 270 uses the information generated including the boundaries of the bins or the mean/median value of each feature in each of the bins.

Figure 8:
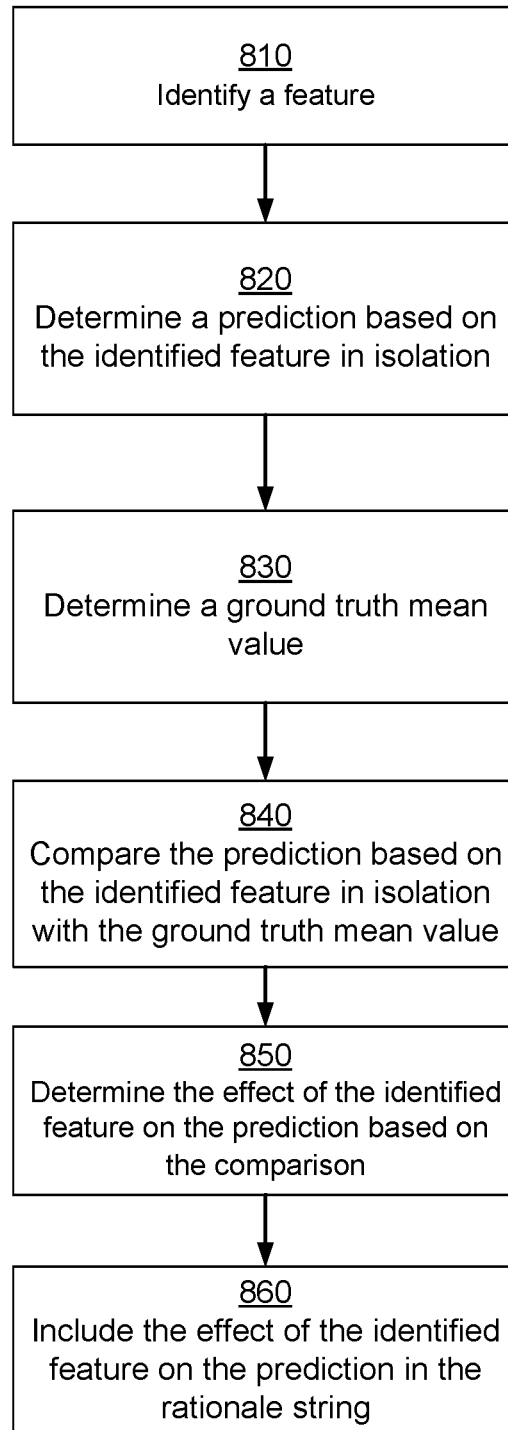
FIG. 8 is a flow chart illustrating the process of determining the effect of a particular feature on a prediction by a machine learning based model according to one embodiment.

The rationale generation module 270 determines the impact or effect of individual features and includes the description in the rationale string that is generated. FIG. 8 is a flow chart illustrating the process of determining the effect of a particular feature on a prediction by a machine learning based model according to one embodiment.

The rationale generation module 270 identifies 810 a feature for determining its impact. The rationale generation module 270 determines 820 a prediction based on the identified feature considered in isolation as follows. The rationale generation module 270 determines the path taken by the decision tree for the given feature value while ignoring the impact of other features. For example, the rationale generation module 270 may ignore conditional branches of the decision tree that are taken as a result of another feature and only identifies conditional branches taken as a result of the identified feature. The rationale generation module 270 determines a prediction based on an execution path triggered by this particular feature. This predicted value represents the prediction with this particular feature considered in isolation. In some embodiments, sets of features may be considered together for generating the rationale. Accordingly, the rationale generation module 270 determines the impact of a set of features on the prediction. The rationale generation module 270 determines a prediction based on the set of features considered in isolation from the remaining features. The rationale generation module 270 determines whether the set of features has a positive effect or a negative effect on the prediction. The rationale generation module 270 also determines a percentage impact of the set of features on the prediction.

In an embodiment, the rationale generation module 270 determines 830 a ground truth mean value representing an aggregate of value being predicted. For example, the aggregate value can be the mean of the values of that feature in the dataset. For example, if the model predicts the value of an item, the ground truth mean value represents values of the item used in the past. The ground truth mean value represents the best guess that a system could make without using any features since it is an aggregate value based on historical data that is determined independent of the features.

The rationale generation module 270 compares 840 the ground truth mean value with the actual value of the features and determines the effect (or impact) of a feature based on the comparison. The rationale generation module 270 determines 850 the value indicating the effect of the identified feature based on a difference between the prediction based on the feature in isolation and the ground truth mean. The rationale generation module 270 adds the effect information to the rationale string to describe why the discount was predicted in a certain way.

The rationale generation module 270 includes 860 information indicating whether the prediction based on the feature in isolation is greater than the ground truth mean value or less than the ground truth mean value. If the prediction based on the feature is greater than the ground truth mean value, the rationale generation module 270 determines that the feature caused the predicted value to increase. If the prediction based on the feature is less than the ground truth mean value, the rationale generation module 270 determines that the feature caused the predicted value to decrease. The effect of each of the features of the observed data is indicated as either (1) positive effect, indicating an increase in the predicted value as a result of the feature value or (2) negative effect, indicating a decrease in the predicted value as a result of the feature value.

In an embodiment, the rational generation module 270 determines a percentage value representing the percentage increase or decrease in the ground truth mean value required to obtain the prediction value for the feature in isolation. The rational generation module 270 includes the percentage value in the rational string to quantify the effect of a feature on the prediction.

In an embodiment, the results of predictions of the machine learning based models are presented via a user interface. The user interface may allow a user to select a predicted value and view the string representing the rationale for the predicted value.

Although the rationale generation is described using decision trees based ML models, the processes described herein can be used for other types of machine learning based models, for example, a random forest based model.

Computer Architecture

Figure 9:
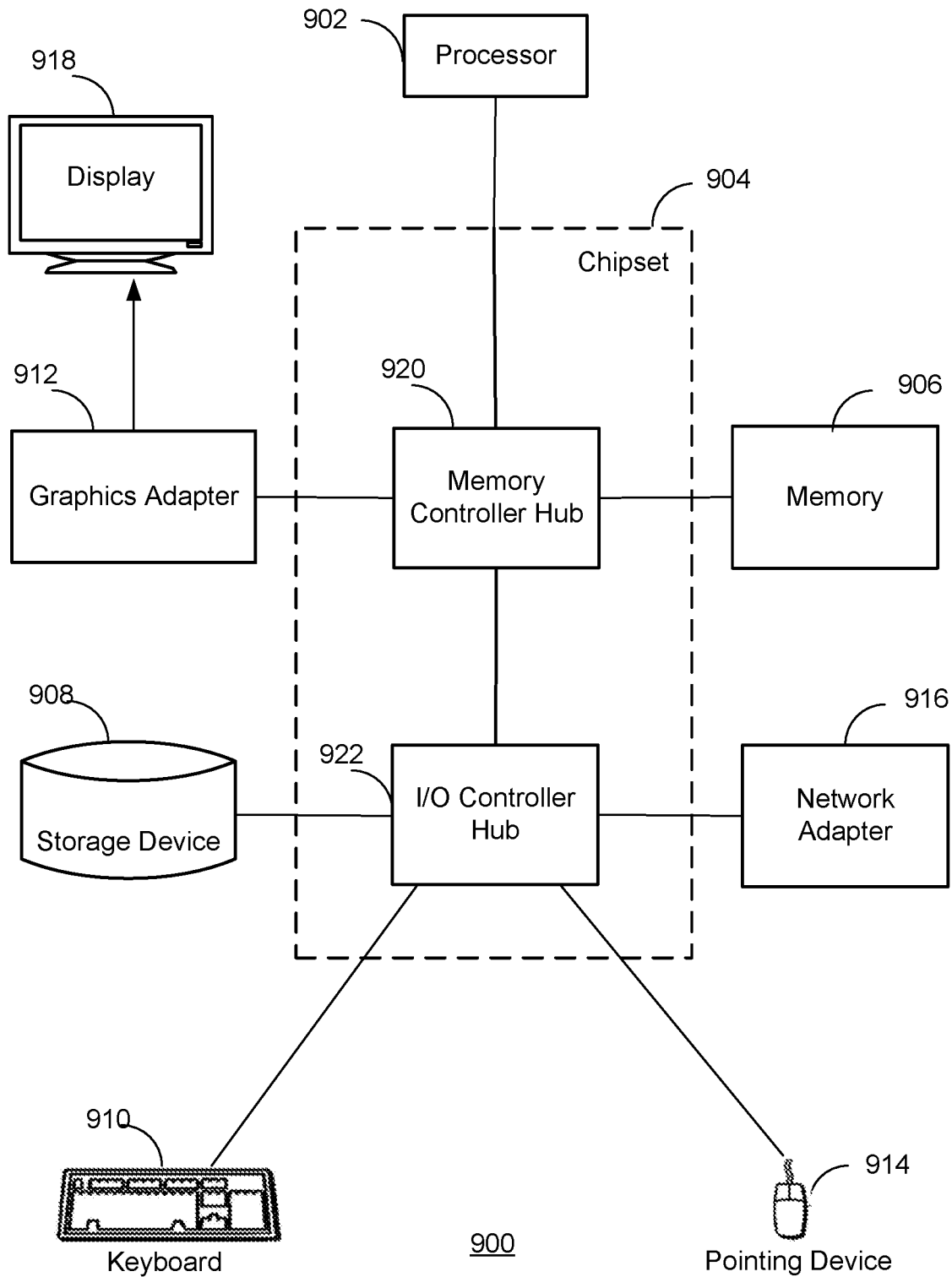
FIG. 9 is a block diagram illustrating a functional view of a typical computer system for use in the environment of FIG. 1 according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 200. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as an online system 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 104 may be a mobile phone with limited processing power, a small display 918, and may lack a pointing device 914. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method for performing predictions, the method comprising:
   receiving, by a client device from an online system, a regression based machine learning model and a measure of accuracy of the regression based machine learning model;
   receiving a request for a task;
   extracting features of the task;
   determining whether a level of expected accuracy for the task is below the measure of accuracy of the regression based machine learning model;
   responsive to determining that the level of expected accuracy for the task is below the measure of accuracy of the regression based machine learning model:
   executing the regression based machine learning model with the extracted features of the task as input to generate a first output;

responsive to determining that a level of expected accuracy for the task is above the measure of accuracy of the regression based machine learning model:
   serializing the extracted features of the task;
   transmitting, from the client device to the online system, the serialized features, causing the online system to execute a second machine learning based model with the features of the task as input to generate a second output; and
   receiving, from the online system, the second output of the second machine learning based model; and
performing the task using the received first output or second output.

2. The computer-implemented method of claim 1, wherein the second machine learning based model is one of a deep learning based neural network model or a random forest based machine learning model.

3. The computer-implemented method of claim 1, further comprising:
   determining, by a client device, work load exceeding a threshold value, a workload representing tasks associated with the client device, wherein the client device executes the regression based machine learning model further in response to the work load exceeding a threshold value.

4. The computer-implemented method of claim 1, further comprising:
   determining, by a client device, that the first task needs to be finished within a threshold time interval, wherein the client device executes the regression based machine learning model further in response to determining that the first task needs to be finished within a threshold time interval.

5. The computer-implemented method of claim 1, wherein the second machine learning based model is a decision tree based machine learning model.

6. The computer-implemented method of claim 5, further comprising:
   receiving, from the online system, a string representing a description of a rationale for the prediction of the second machine learning based model, the string generated based on an execution of the decision tree based machine learning model.

7. The computer-implemented method of claim 1, wherein the online system is a multi-tenant system and the client device is associated with a user of a tenant of the multi-tenant system, wherein each of the regression based machine learning model and the second machine learning based model is trained using training data set of the tenant.

8. A non-transitory computer readable storage medium for storing instructions that when executed by a computer processor cause the computer processor to perform steps for performing predictions, the steps comprising:
   receiving, by a client device from an online system, a regression based machine learning model and a measure of accuracy of the regression based machine learning model;
   receiving a request for a task;
   extracting features of the task;
   determining whether a level of expected accuracy for the task is below the measure of accuracy of the regression based machine learning model;
   responsive to determining that the level of expected accuracy for the task is below the measure of accuracy of the regression based machine learning model:
      executing the regression based machine learning model with the features of the task as input to generate a first output;
   responsive to determining that a level of expected accuracy for the task is above the measure of accuracy of the regression based machine learning model:
      serializing the extracted features of the task;
      transmitting, from the client device to the online system, the serialized features, causing the online system to execute a second machine learning based model with the features of the task as input to generate a second output; and
      receiving, from the online system, the second output of the second machine learning based model; and
   performing the task using the received first output or second output.

9. The non-transitory computer readable storage medium of claim 8, wherein the second machine learning based model is one of a deep learning based neural network model or a random forest based machine learning model.

10. The non-transitory computer readable storage medium of claim 8, wherein the stored instructions further cause the computer processor to perform steps comprising:
   determining, by a client device, work load exceeding a threshold value, the work load representing tasks associated with the client device, wherein the client device executes the regression based machine learning model further in response to the work load exceeding a threshold value.

11. The non-transitory computer readable storage medium of claim 8, wherein the stored instructions further cause the computer processor to perform steps comprising:
   determining, by a client device, that the task needs to be finished within a threshold time interval, wherein the client device executes the regression based machine learning model further in response to determining that the first needs to be finished within a threshold time interval.

12. The non-transitory computer readable storage medium of claim 8, wherein the second machine learning based model is a decision tree based machine learning model.

13. The non-transitory computer readable storage medium of claim 12, wherein the stored instructions further cause the computer processor to perform steps comprising:
   receiving, from the online system, a string representing a description of a rationale for the prediction of the second machine learning based model, the string generated based on an execution of the decision tree based machine learning model.

14. The non-transitory computer readable storage medium of claim 12, wherein the online system is a multi-tenant system and the client device is associated with a user of a tenant of the multi-tenant system, wherein each of the regression based machine learning model and the second machine learning based model is trained using training data set of the tenant.

15. A computer system comprising:
   a computer processor; and
   a non-transitory computer readable storage medium for storing instructions that when executed by a computer processor cause the computer processor to perform steps for performing predictions, the steps comprising:
   receiving, by a client device from an online system, a regression based machine learning model and a measure of accuracy of the regression based machine learning model;
   receiving a request for a task;

extracting features of the task;
determining whether a level of expected accuracy for the task is below the measure of accuracy of the regression based machine learning model;
responsive to determining that the level of expected accuracy for the task is below the measure of accuracy of the regression based machine learning model:
executing the regression based machine learning model with the features of the task as input to generate a first output;
responsive to determining that a level of expected accuracy for the task is above the measure of accuracy of the regression based machine learning model:
serializing the features of the task;
transmitting, from the client device to the online system, the serialized features, causing the online system to execute a second machine learning based model with the features of the task as input to generate a second output; and
receiving, from the online system, the second output of the second machine learning based model; and
performing the task using the received first output or second output.

16. The computer system of claim 15, wherein the stored instructions further cause the computer processor to perform steps comprising:
determining, by a client device, work load exceeding a threshold value, the work load representing tasks associated with the client device, wherein the client device executes the regression based machine learning model further in response to the work load exceeding a threshold value.

17. The computer system of claim 15, wherein the stored instructions further cause the computer processor to perform steps comprising:
determining, by a client device, that the task needs to be finished within a threshold time interval, wherein the client device executes the regression based machine learning model further in response to determining that the first task needs to be finished within a threshold time interval.

18. The computer system of claim 15, wherein the second machine learning based model is a decision tree based machine learning model.

19. The computer system of claim 18, wherein the stored instructions further cause the computer processor to perform steps comprising:
receiving, from the online system, a string representing a description of a rationale for the prediction of the second machine learning based model, the string generated based on an execution of the decision tree based machine learning model.

20. The computer system of claim 15, wherein the online system is a multi-tenant system and the client device is associated with a user of a tenant of the multi-tenant system, wherein each of the regression based machine learning model and the second machine learning based model is trained using training data set of the tenant.

* * * * *

UNITED STATES PATENT AND TRADEMARK OFFICE
CERTIFICATE OF CORRECTION

PATENT NO. : 11,651,291 B2
APPLICATION NO. : 16/777686
DATED : May 16, 2023
INVENTOR(S) : Karanth et al.

It is certified that error appears in the above-identified patent and that said Letters Patent is hereby corrected as shown below:

In the Claims

In Column 17, in Claim 3, Line 22, delete "workload" and insert -- work load --, therefor.

In Column 18, in Claim 11, Line 37, delete "first" and insert -- task --, therefor.

In Column 20, in Claim 17, Line 11, delete "first task" and insert -- task --, therefor.

Signed and Sealed this
Twenty-ninth Day of August, 2023

Katherine Kelly Vidal
*Director of the United States Patent and Trademark Office*